(12) United States Patent
Kono et al.

(10) Patent No.: US 7,766,555 B2
(45) Date of Patent: Aug. 3, 2010

(54) ROLLER BEARING AND METHOD OF ASSEMBLING THE SAME

(75) Inventors: Shingo Kono, Iwata (JP); Kousuke Obayashi, Iwata (JP); Hideki Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 1092 days.

(21) Appl. No.: 11/052,771

(22) Filed: Feb. 9, 2005

(65) Prior Publication Data

US 2005/0185875 A1   Aug. 25, 2005

(30) Foreign Application Priority Data

Feb. 20, 2004   (JP)   ............................. 2004-044019

(51) Int. Cl.
F16C 33/48    (2006.01)
F16C 43/04    (2006.01)
F16C 33/46    (2006.01)

(52) U.S. Cl. ..................... 384/572; 384/560; 384/577
(58) Field of Classification Search ............... 384/560, 384/572, 575, 576, 577, 523
See application file for complete search history.

(56) References Cited

U.S. PATENT DOCUMENTS

| | | | | |
|---|---|---|---|---|
| 612,472 | A | * | 10/1898 | Woodcock ................. 384/575 |
| 1,173,719 | A | * | 2/1916 | Hirth ........................ 384/577 |
| 1,426,578 | A | | 8/1922 | Lott |
| 1,426,595 | A | | 1/1933 | Mitchel |
| 1,928,823 | A | * | 10/1933 | Young ....................... 384/577 |
| 2,503,070 | A | * | 4/1950 | Reiss ........................ 384/577 |
| 2,540,283 | A | | 2/1951 | Parsons et al. |
| 3,102,760 | A | * | 9/1963 | Aho .......................... 384/575 |
| 3,353,881 | A | * | 11/1967 | Steinert .................... 384/577 |
| 3,399,008 | A | * | 8/1968 | Farrell et al. .............. 384/577 |
| 3,477,773 | A | | 11/1969 | Alton |
| 4,277,116 | A | | 7/1981 | Lauterbach |
| 4,541,743 | A | | 9/1985 | Hatano |

(Continued)

FOREIGN PATENT DOCUMENTS

CA    2 333 297    12/1999

(Continued)

OTHER PUBLICATIONS

Furukawa Taichiro et al, Patent Abstracts of Japan, "Shell-Shaped Roller Bearing And Manufacturing Thereof", Publication No. 06-307456, Publication Date: Nov. 1, 1994.

(Continued)

*Primary Examiner*—Thomas R Hannon
*Assistant Examiner*—Justin Krause

(57) ABSTRACT

A roller bearing utilizing a roller retainer, which has an excellent assemblability in the sense that the assembly line can be automated and which eliminates various problems inherent in the full complement roller bearing The roller bearing includes an outer race having a raceway, a plurality of rollers held in rolling contact with the raceway, and a ring-shaped roller retainer having a plurality of pockets, each rollingly receiving the respective roller, spacedly defined therein in a direction circumferentially thereof to form a ladder-like structure. The roller retainer has a plurality of slits that are spacedly defined in a direction circumferential thereof so as to extend from one axial end or the other axial end of the roller retainer to a position adjacent the other axial end or one axial end.

3 Claims, 8 Drawing Sheets

U.S. PATENT DOCUMENTS

| | | | |
|---|---|---|---|
| 4,881,830 A * | 11/1989 | Shepard et al. | 384/577 |
| 5,000,303 A | 3/1991 | Shoji et al. | |
| 5,039,231 A | 8/1991 | Kispert et al. | |
| 5,417,502 A * | 5/1995 | Waldert et al. | 384/572 |
| 5,615,956 A | 4/1997 | Oba et al. | |
| 5,743,660 A | 4/1998 | Hillmann | |
| 5,957,592 A | 9/1999 | Yamanaka | |
| 6,102,579 A * | 8/2000 | Kupietz | 384/572 |
| 6,179,474 B1 | 1/2001 | Podhajecki | |
| 6,315,456 B1 | 11/2001 | Tanimoto et al. | |
| 6,666,584 B2 * | 12/2003 | Yokota | 384/577 |
| 6,857,785 B2 | 2/2005 | Takahashi et al. | |
| 7,220,060 B2 * | 5/2007 | Kono et al. | 384/577 |
| 7,390,127 B2 * | 6/2008 | Kono et al. | 384/572 |
| 2002/0141678 A1 * | 10/2002 | Takahashi et al. | 384/572 |
| 2003/0077017 A1 | 4/2003 | Fugel et al. | |
| 2005/0185875 A1 | 8/2005 | Kono et al. | |

FOREIGN PATENT DOCUMENTS

| | | |
|---|---|---|
| DE | 195 06 796 A1 | 10/1995 |
| DE | 196 41 546 A1 | 4/1998 |
| GB | 445090 | 4/1936 |
| GB | 1604570 | 5/1978 |
| JP | 43-009601 B | 4/1943 |
| JP | 44-27290 | 11/1969 |
| JP | 57-163727 A | 10/1982 |
| JP | 58-102824 | 6/1983 |
| JP | 08-326744 | 10/1996 |
| JP | 11-344029 | 12/1999 |
| JP | 2000-179544 | 6/2000 |
| JP | 2000-213545 | 8/2000 |
| JP | 2000-320558 | 11/2000 |
| JP | 2002-517676 | 6/2002 |
| JP | 2002-276672 | 9/2002 |
| JP | 2002-364652 | 12/2002 |
| JP | 2003-166540 | 6/2003 |
| JP | 2005-054871 | 3/2005 |
| JP | 2005-249163 | 9/2005 |

OTHER PUBLICATIONS

Oba Fumio et al., Patent Abstracts of Japan, "Roller Bearing", Publication No. 07-238940, Publication Date: Sep. 12, 1995.

Ishiyama Tetsuo, Patent Abstracts of Japan, "Shell—Shaped Roller Bearing and Manufacturing Thereof", vol. 1995, No. 02, Publication No. 06307456, Publication Date: Nov. 1, 1994.

Tajima Ryuji, Patent Abstracts of Japan, Retainer for Conical Roller Bearing and Manufacturing of Said Retainer, vol, 005, No. 147, Publication No. 56076720, Publication Date: Jun. 24, 1981.

Maebotoke Makoto, Patent Abstracts of Japan, "Tapered Roller Bearing and Method of Assembly", vol. 2000, No. 22, Publication No. 2001-140900, Publication Date: May 22, 2001.

Japanese Office Action issued on Jan. 6, 2009in corresponding Japanese Patent Application 2004-044019.

* cited by examiner

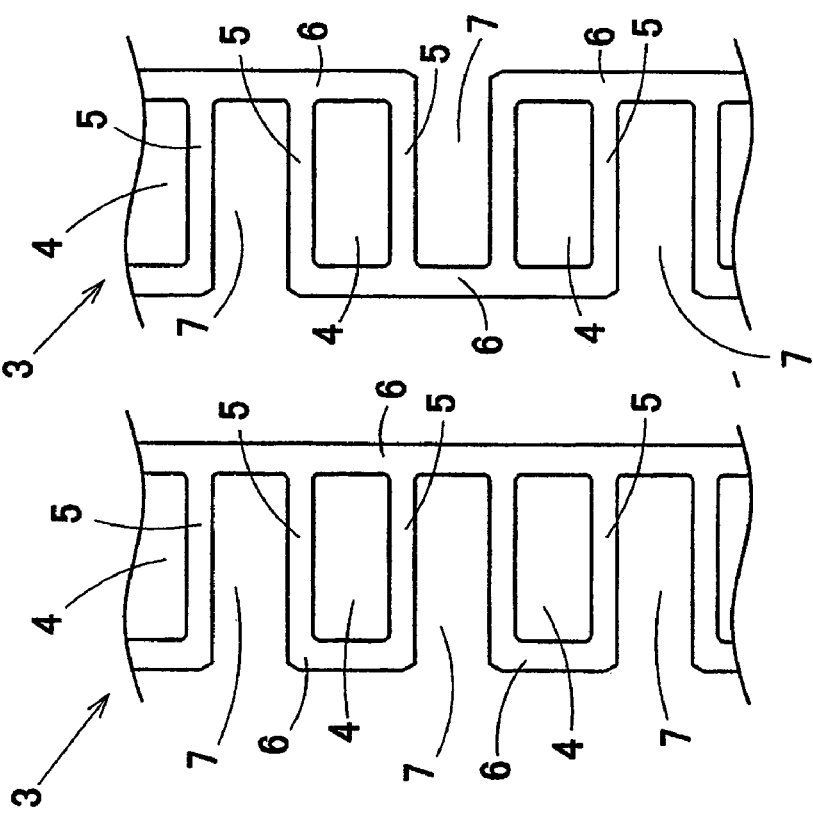

ROLLER BEARING AND METHOD OF ASSEMBLING THE SAME

BACKGROUND OF THE INVENTION

1. Field of the Invention

The present invention relates to a roller bearing equipped with a roller retainer, such as a needle roller bearing, which can be employed in an application similar to that in which the full complement roller bearing having an outer race is employed, and also relates to a method of assembling such roller bearing.

2. Description of the Prior Art

In the application where the outer diameter of the bearing is limited and, on the other hand, a relatively large load bearing capacity is required, the full complement roller bearings have hitherto been employed in general. Since the full complement roller bearing has no pillar intervening between the neighboring rollers, the number of rollers employed therein can be increased as compared with the retainer-equipped roller bearing and the load bearing capacity can therefore be increased.

However, since the full complement roller bearing makes no use of the roller retainer, it is often experienced that some or all of the rollers tend to separate or fall from the right position during the handling thereof prior to the full complement roller bearing being installed on a machine or equipment. For this reason, various suggestions have hitherto been made to achieve a non-detachability of the rollers, that is, to enable the roller to be retained in position. For example, the Japanese Laid-open Patent Publication No. 6-307456 discloses rollers each having its opposite end faces steepled coaxially outwardly so that a press-worked outer race having collars formed at its opposite ends can saddle each roller with the collars receiving the steeples of the respective roller. The Japanese laid-open Patent Publication No. 7-238940, for example, discloses the filling of a thermally curable grease to achieve the non-detachability of rollers in the full complement roller bearing.

The first full complement roller bearing employing the rollers formed with the steeples has the following problems:

The effective length of each roller tends to be reduced a quantity corresponding to the size of the steeples formed therein.

Since the opposite end faces of each roller are steepled or have the steeples, the frictional wear of the roller end faces tends to be prominent when the full complement roller bearing is employed in the environment where an induced thrust force is large.

Since the opposite end faces of each roller are steepled or have the steeples, the roller is costly as compared with the roller having flat end faces.

On the other hand, the second full roller bearing utilizing the thermally curable grease has the following problems:

The use of the thermally curable grease limits the temperature under which the full complement roller bearing can be operated.

The type of grease and the type of oil are limited.

In view of the foregoing, it has been suggested in, for example, the Japanese Patent Application No. 2003-285566 that in the retainer-equipped roller bearing a generally ring-shaped roller retainer having a plurality of pockets defined spacedly in a direction circumferentially thereof is made of a synthetic resin deformable in a direction radially thereof and, on the other hand, a pillar present between the neighboring pockets retains the respective roller from a radially inner side of the roller bearing and has an outer diameter smaller than the diameter of the pitch circle in which the rollers are arranged.

According to the suggested design, the rollers can be retained in the respective pockets of the roller retainer by, after the rollers have been mounted around an inner periphery of the outer race, inserting the roller retainer into the circular row of the rollers while deforming a portion of the roller retainer radially against its own elasticity and by subsequently allowing the roller retainer to restore to the original shape or diameter.

However, even the full complement roller bearing of the suggested design has the following problems:

Since the assemblage requires a portion of the roller retainer to be radially deformed against its own elasticity, utmost care is required to avoid an undesirable reduction in shape precision of the roller retainer after the assemblage, which would otherwise occur as a result of the deformation.

Since during the assemblage that portion of the roller retainer is radially deformed against its own elasticity, automation of the assembly line is difficult to achieve.

SUMMARY OF THE INVENTION

Accordingly, the present invention has been devised to substantially eliminate the various problems and inconveniences inherent in the full complement roller bearing and is intended to provide an improved roller bearing utilizing a roller retainer, which has an excellent assemblability in the sense that the assembly line can be automated.

It is a related important object of the present invention to provide a method of assembling the roller bearing referred to above.

In order to accomplish these objects of the present invention, the present invention in accordance with a first aspect thereof provides a roller bearing, which includes an outer race having a raceway defined therein, a plurality of rollers held in rolling contact with the raceway, and a ring-shaped roller retainer having a plurality of pockets, each rollingly receiving the respective roller, spacedly defined therein in a direction circumferentially thereof to form a ladder-like structure. The roller retainer has a plurality of slits that are spacedly defined in a direction circumferential thereof so as to extend from one axial end or the other axial end of the roller retainer to a position adjacent the other axial end or one axial end.

According to the first aspect of the present invention, when the roller bearing is to be assembled, after the rollers have been arranged inside the outer race, the roller retainer can be inserted into the circular row of the rollers from the side of the slit openings by radially inwardly constricting one axial end or the other axial end of the roller retainer. Thereafter, an external force applied to the roller retainer to radially inwardly constrict the roller retainer is released to allow the roller retainer as whole to restore to the original shape, completing the assemblage of the roller bearing with the rollers received within the respective pockets. In view of the presence of the slits, during the insertion the roller retainer can be elastically deformed by the elasticity of the material used to form the roller retainer and, therefore, the flexure deformation of the roller retainer can advantageously be minimized and an undesirable reduction in shape precision brought about by the deformation can advantageously be prevented, thereby increasing the assemblability and the assembling precision. Also, the assemblage can be automated.

In a preferred embodiment of the present invention, the roller retainer has pillars, each defined between the neighboring pockets. Each of the pillars is positioned between the neighboring rollers to retain the corresponding rollers from a radially inner side of the roller bearing. This roller retainer may have an outer diameter of a circle depicted by respective pillars is smaller than the diameter of a pitch circle depicted by the circular row of the rollers.

According to this preferred embodiment, since the pillars of the roller retainer retain the rollers from the radially inner side of the roller bearing while being each positioned between the neighboring rollers and, at the same time, the outer diameter of the circle depicted by the respective pillars is chosen to be smaller than the diameter of the pitch circle of the circular row of the rollers, the pillars of the roller retainer can be disposed offset from the pitch circle of the circular row of the rollers. For this reason, none of the pillars expand the space between the neighboring rollers and, therefore, the number of the rollers used can advantageously be increased to a value comparable with that used in the full complement roller bearing, while the roller bearing of the present invention exhibits a non-detachability of the rollers by the use of the roller retainer. Accordingly, the roller bearing of the present invention is effective to substantially eliminate the various problems hitherto found with the full complement roller bearings.

In the practice of the present invention, each of the slits may concurrently serve as a pocket for accommodating therein the corresponding roller. In other words, a ring part at one end of the roller retainer may be depleted at a location of the corresponding pocket to define a depleted area so that each of the slits can be constituted by the respective pocket and the depleted area.

By allowing the rollers to be disposed inside the slits, the number of the rollers can be increased and, therefore, the load bearing capacity of the roller bearing can advantageously be increased.

In another preferred embodiment of the present invention, the width of each of the slits as measured in a direction circumferentially of the roller retainer and the number of the slits employed in the roller retainer may be so chosen that the outer diameter of a ring body assumed by the ring part if circumferentially extending arcuate portions of the roller retainer excluding the slits are jointed together can be smaller than the inner diameter of a circle inscribed by a circular row of the rollers. According to this preferred feature, after the rollers have been arranged inside the outer race, a job of inserting the roller retainer into the circular row of the rollers can easily be accomplished by inserting first the side of the slit openings while radially inwardly constricting such side, resulting in increase of the assemblability.

In a further preferred embodiment of the present invention, at least one of opposite outer peripheral ends of the roller retainer may be so chamfered as to represent a tapered shape or a rounded shape. The chamfered outer peripheral end can allow the roller retainer to be smoothly inserted into the circular row of the rollers during the assemblage thereof, resulting in further increase of the assemblability.

The present invention in accordance with a second aspect thereof provides a roller bearing, which includes an outer race having a raceway defined therein, a plurality of rollers held in rolling contact with the raceway, and a generally ring-shaped roller retainer having a plurality of pockets, each rollingly receiving the respective roller, spacedly defined therein in a direction circumferentially thereof to form a ladder-like structure. In this roller bearing, the roller retainer has no slits. The retainer has pillars each positioned between the neighboring pockets for retaining the corresponding rollers from a radially inner side of the roller bearing. An outer diameter of a circle depicted by respective pillars of the roller retainer is smaller than the diameter of a pitch circle depicted by a circular row of the rollers. Also, a split area is defined at one location of the roller retainer in a circumferential direction thereof.

Even with the roller bearing according to the second aspect of the present invention, the number of the rollers used can advantageously be increased to a value comparable with that used in the full complement roller bearing, while the roller bearing of the present invention exhibits a non-detachability of the rollers by the use of the roller retainer. Also, the assemblability can be increased and the assemblage can be automated.

The roller bearing according to the second aspect of the present invention can be assembled by, after the rollers have been arranged inside the outer race, inserting the roller retainer into the circular row of the roller from the side of one axial end of the roller retainer, where the split area is defined, while constricting radially inwardly such one end and then by allowing the roller retainer to restore to the original shape or diameter by the effect of the elasticity possessed by the material used to form the roller retainer. At this time, the roller retainer can be elastically deformed during the insertion by its own elasticity and, therefore, the flexure deformation of the roller retainer can advantageously be minimized and an undesirable reduction in shape precision brought about by the deformation can advantageously be prevented, thereby increasing the assemblability and the assembling precision.

In a preferred embodiment of the present invention, one of the rollers may be positioned inside the split area in the roller retainer. This is particularly advantageous in that the number of the rollers can be increased and the load bearing capacity of the roller bearing can also be increased.

The present invention furthermore provides methods of assembling the roller bearing. The first assembling method can advantageously be practiced to assembly the roller bearing which has the slits defined only at one axial end of the roller retainer. This first assembling includes positioning the rollers inside the outer race to form a circular row of the roller, and inserting the roller retainer axially into the circular row of the rollers by radially inwardly constricting such one axial end of the roller retainer, which is to be first inserted into the outer race, by means of an expandable chuck having a conical inner surface and then by pushing the roller retainer by means of a pusher jig to a position inside the circular row of the rollers and further by allowing the roller retainer to restore to the original shape or diameter by the effect of an elasticity owned by a material used to form the roller retainer.

With the first assembling method, since the roller retainer, while one axial end thereof (the side of the alit openings) is radially inwardly constricted by means of the expandable chuck having the conical inner surface, is pushed by the use of the pusher jig, the roller retainer can easily be inserted axially into the circular row of the rollers even though the roller retainer has the slits only at one end thereof. Also, no undesirable load will act on the roller retainer during the insertion and, therefore, reduction in shape precision which would otherwise be brought about as a result of deformation during the insertion can be prevented, resulting in increase of the assemblability and the assembling precision. In addition, the assemblage can be automated.

The second assembling method can advantageously be practiced to assembly the roller bearing which has the slits defined at the opposite axial ends of the roller retainer. This second assembling method includes positioning the rollers inside the outer race to form a circular row of the rollers, and inserting the roller retainer axially into the circular row of the rollers by pushing the roller retainer into a guide jig having a conical inner surface while radially inwardly constricting one of the opposite axial ends, which is to be first pushed into the circular row of the rollers, by means of the guide jig and then by allowing the roller retainer to restore to the original shape or diameter by the effect of an elasticity owned by a material used to form the roller retainer.

According to the second assembling method, with no need to use any jig such as a collet chuck, the roller bearing can readily be assembled merely by pushing the roller retainer into the guide jig. In such case, the flexure deformation of the roller retainer can advantageously be minimized and an undesirable reduction in shape precision brought about by the deformation can advantageously be prevented, thereby increasing the assemblability and the assembling precision. Also, since the roller retainer has the slits at its opposite sides, the directionality constraint of insertion of the roller retainer can be eliminated, resulting in further increase of the assemblability. In addition, the automation of the assemblage can be achieved with a simple equipment.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2A is a fragmentary plan view showing a portion of a roller retainer employed in the roller bearing shown in FIG. 1A;

FIG. 2B is a view similar to FIG. 2A, showing a modified form of the roller retainer;

FIG. 2C is a view similar to FIG. 2A, showing a further modified form of the roller retainer;

DETAILED DESCRIPTION OF THE EMBODIMENTS

Figure 1A:
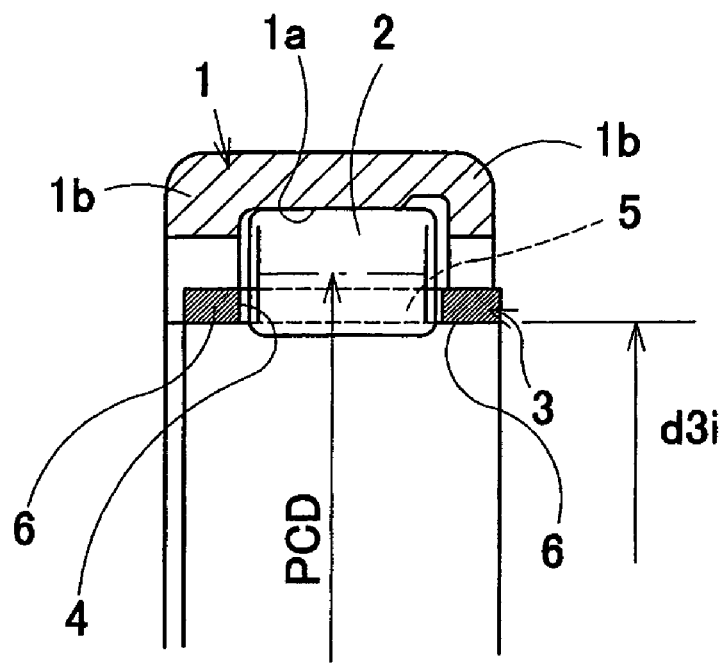
FIG. 1A is a fragmentary longitudinal sectional view of a roller bearing according to a preferred embodiment of the present invention.

With particular reference to FIGS. 1 to 6, a roller bearing according to a first preferred embodiment of the present invention will be described in detail. The roller bearing includes an outer race 1 having an inner peripheral surface, a plurality of rollers 2 arranged in a circular row and held rollingly in contact with a raceway 1a defined by the inner peripheral surface of the outer race, and a ring-shaped roller retainer 3. The roller retainer 3 has pockets 4 spacedly defined in a direction circumferentially thereof so as to form a ladder-like structure or a step-like structure. The roller retainer 3 also has pillars 5 each defined between the neighboring pockets 4. Each pillar 5 is so positioned between the neighboring rollers 2 that the rollers 2 can be retained from a radially inner side of the roller bearing.

The outer race 1 has its opposite ends formed with radially inwardly extending collars 1b and is of a drawn cup type, that is, a shaped product made of a steel plate by the use of a press work.

The roller retainer 3 is made of an elastically deformable synthetic resin such as polyamide (for example, PA66 or PA46) or polyacetal. If the synthetic resin is a non-reinforced synthetic resin or a reinforced synthetic resin containing not higher than 30% of reinforcement fibers such as carbon fibers or glass fibers, the resultant roller retainer 3 can have a flexibility and a strength according to the bearing size and the bearing application.

As shown in any one of FIGS. 2A to 2C, the roller retainer 3 has its opposite axial ends each in the form of a ring part 6, with the pillars 5 provided equidistantly between the opposite ring parts 6 in a direction circumferentially thereof. A space between the neighboring pillars 5 defines the pocket 4 for accommodating the respective roller 2.

Figure 1B:
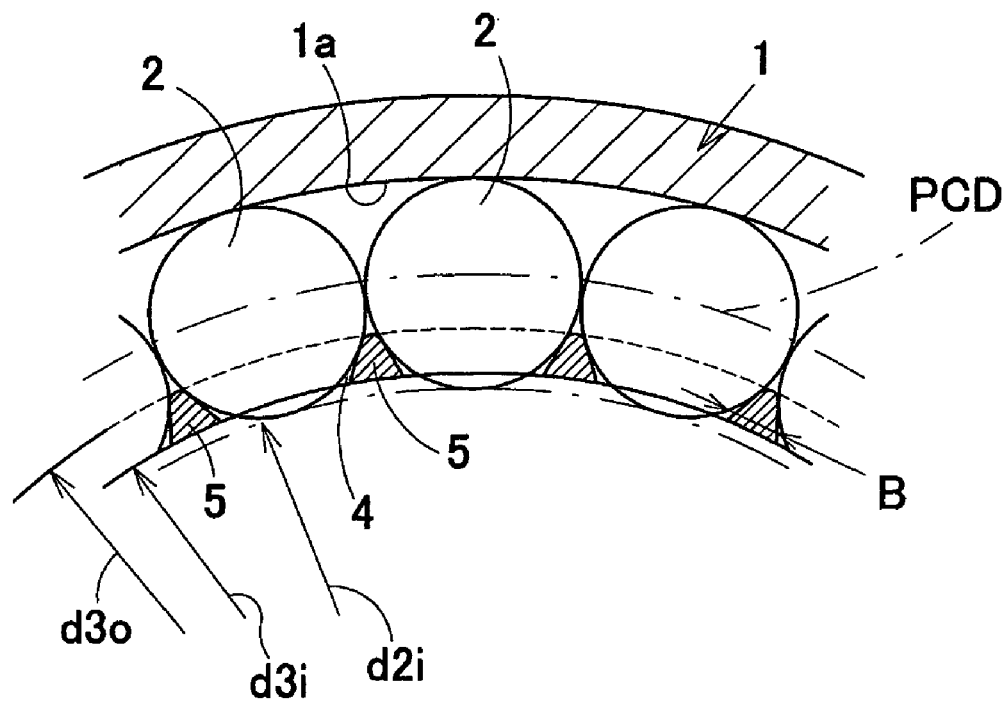
FIG. 1B is a fragmentary transverse sectional view of the roller bearing shown in FIG. 1A.

As shown in FIG. 1B, each of the pillars 5 of the roller retainer 3 represents a generally triangular sectional shape. The roller retainer 3 has an inner diameter d3i which is greater by 0.1 mm or more than the maximum diameter d2i of the circle inscribed by the circular row of the rollers 2. The difference between the inner diameter d3i and the maximum diameter d2i is preferably equal to or greater than the specific value of 0.1 mm regardless of the bearing size. The outer diameter d3o of the circle depicted by respective vertexes of the pillars 5 is chosen to be smaller than the diameter of the pitch circle POD by, for example, 0.1 mm or more. The difference between the outer diameter d3o and the pitch circle diameter POD may be of a value equal to or greater than the predetermined value according to the bearing size or the like. Each of the pillars 5 has a thickness or a circumferential width B that is preferably chosen to be within the range of 15 to 30% of the diameter of the roller 2. With this configuration, the roller retainer 3 may accommodate a number of rollers 2 that is substantially similar to a maximum capacity number of rollers that may be accommodated in the bearing space, as in a full complement roller bearing.

As shown in any one of FIGS. 2A to 2C, the roller retainer 3 is of the ladder-like or step-like structure in which pockets 4 are spacedly defined therein in a direction circumferentially thereof and in which axial slits 7, 7A are formed at a plurality of locations in a direction circumferentially thereof so as to extend between the pockets 4 from one axial end or the other axial end of the roller retainer to a position adjacent the opposite axial end or one axial end.

Specifically, FIG. 2A illustrates the roller retainer 3, in which the axial slits 7 are formed therein so as to extend from one axial end (a left end as viewed in FIG. 2A) towards the other axial end (a right end as viewed in FIG. 2A) of the roller retainer 3. In contrast thereto, FIG. 2B illustrates the roller retainer 3, in which the axial slits 7 extending from one axial end towards the other axial end of the roller retainer 3 and the axial slits 7 extending from the other axial end towards one axial end of the roller retainer 3 are so arranged to alternate with each other in a direction circumferentially of the roller retainer 3, with the respective pockets 4 intervening therebetween.

In both of the roller retainers 3 shown respectively in FIGS. 2A and 2B, the axial slits 7 are comprised of a segment, in which a portion of the ring part 6 between the neighboring pillars 5 is depleted substantially completely, and a segment which concurrently serves as a pocket between the neighboring pillars 5.

FIG. 2C illustrates the roller retainer 3, in which the axial slits 7 and 7A extend from one axial end (a left end as viewed in FIG. 2C). Specifically, the axial slits 7 is comprised of a segment, in which a portion of the ring part 6 between the neighboring pillars 5 is depleted substantially completely, and a segment which concurrently serves as a pocket between the neighboring pillars 5. On the other hand, the axial slits 7A is comprised a segment, in which a portion of the ring part 6 between the neighboring pillars 5 is depleted partially at a location 6a, and a segment which concurrently serves as a pocket between the neighboring pillars 5. The axial slits 7 and 7A are so formed in the roller retainer 3 as to alternate with each other in a direction circumferentially of the roller retainer 3.

It is to be noted that in both of the roller retainers 3 shown respectively in FIGS. 2A and 2B, the pockets 4 and the slits 7 are so formed as to alternate with each other in a direction circumferentially of the corresponding roller retainer 3 and each of the pillars 5 is defined between the respective pocket 4 and the neighboring slit 7 which concurrently serves as a pocket.

However, in the roller retainer 3 shown in FIG. 2C, each of the slits 7A may be formed every set of the pockets 4 while each of the pillars 5 is provided between the respective pocket 4 and the adjacent slit 7 concurrently serving as a pocket. In addition, although not shown, some of the pillars 5 are also provided between the pockets 4 defined continuously in line. Even in the roller retainer 3 shown in any one of FIGS. 2A and 2B, each of the slits 7 may be formed every set of the pockets 4, not every single pocket 4.

Each of the pillars 5 positioned between each of the pockets 4 and the associated slit 7 and also between the neighboring pockets 4 may be of a triangular sectional shape, as shown in FIG. 1B.

Figure 3:
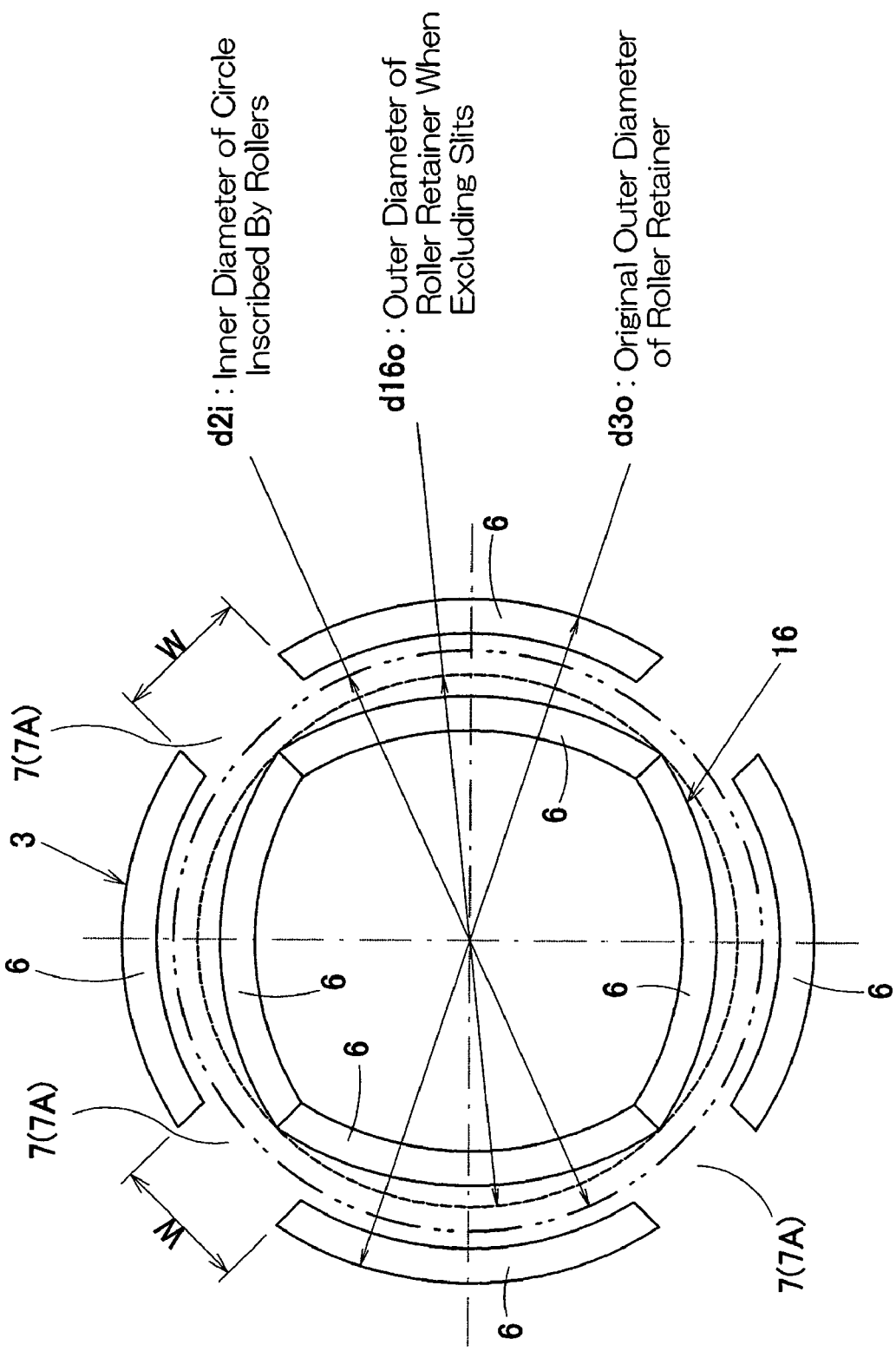
FIG. 3 is an explanatory diagram showing the roller retainer before the latter is radially inwardly deformed shown in comparison with that after it has been radially inwardly deformed.
Figure 4:
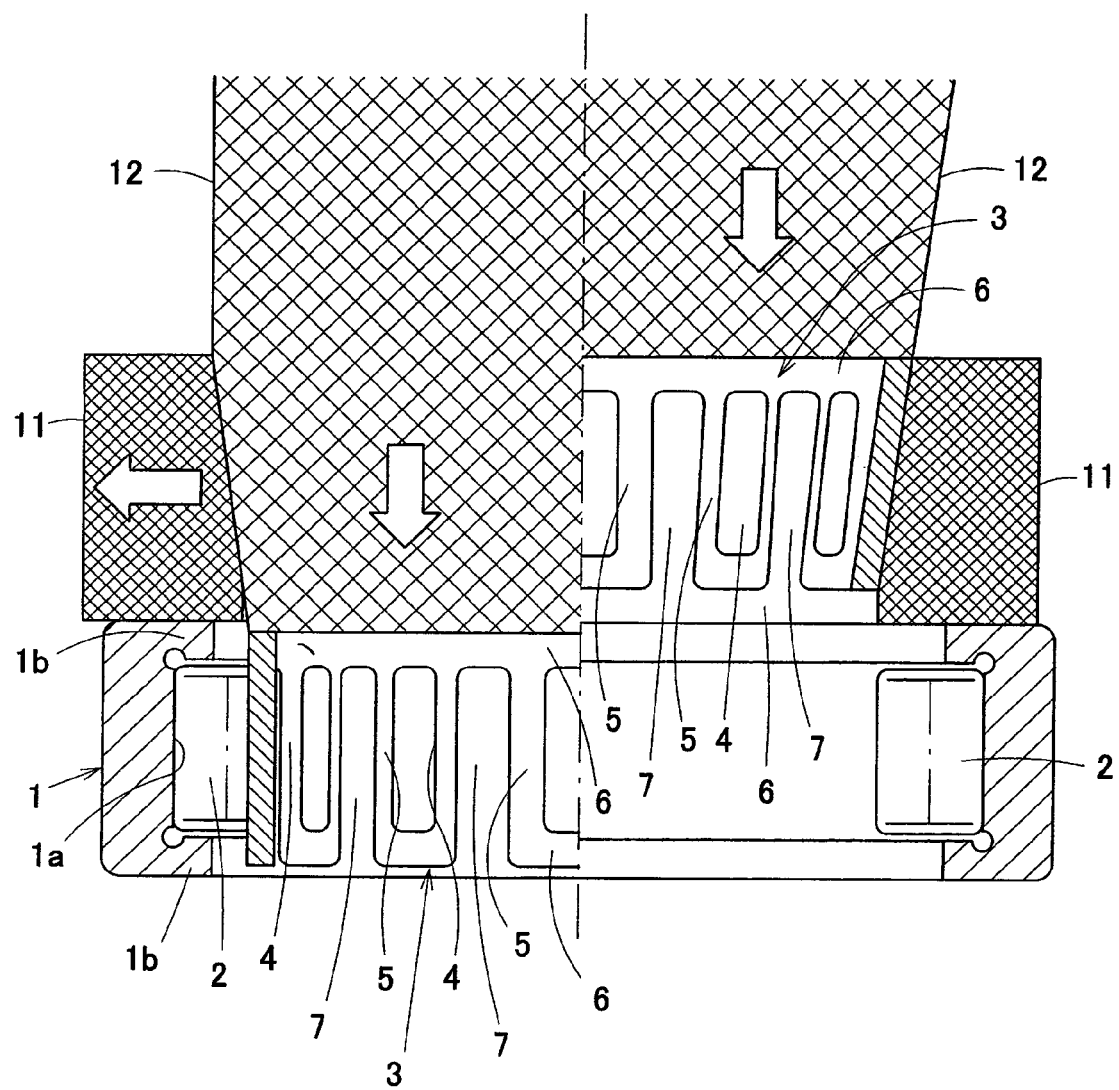
FIG. 4 is an explanatory diagram showing the manner in which the roller bearing is assembled.
Figure 5:
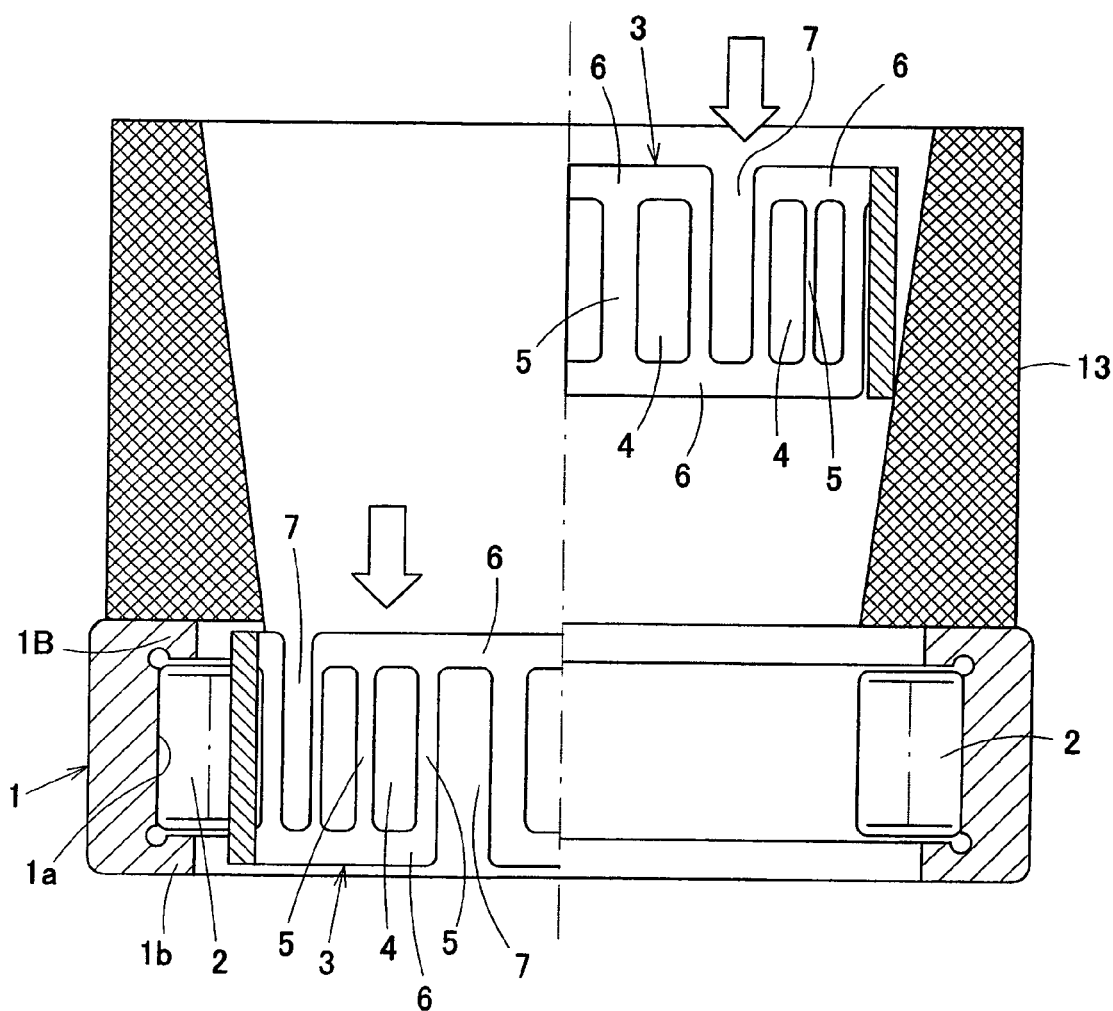
FIG. 5 is an explanatory diagram showing the different manner in which the roller bearing is assembled.

FIG. 3 illustrates an explanatory diagram showing one end of the roller retainer 3, where the slits 7 (7A) are formed, before the roller retainer 3 is radially inwardly deformed, shown in comparison with such one end after the roller retainer 3 has been radially inwardly deformed. As shown therein, the width W of each of the slits 7 (7A) as measured in a direction circumferentially of the roller retainer 3 and the number of the slits 7 (7A) are so chosen that the outer diameter d16o of a ring body 16 assumed by the ring part 6 if circumferentially extending arcuate portions (ring part 6) excluding the slits 7 (7A) are jointed together can be smaller than the inner diameter d2i of the inscribed circle of the circular row of the rollers 2. Where the pockets 4 and the slits 7 are so formed as to alternate with each other in the circumferential direction such as in the roller retainer 3 shown in any one of FIGS. 2A and 2B, the required relation between the outer diameter d16o and the inner diameter d2i can be naturally satisfied, but even in the case of the retainer 3 of FIG. 2C and/or even where the number of the slits 7 is relatively small and/or the opening width W of the slits 7 is small, the required relation between the outer diameter d16o and the inner diameter d2i of the inscribed circle has to be preferably satisfied.

Where the roller retainer 3 is of a structure in which the slits 7 (7A) are formed, any one of first and second assembling methods such as shown in FIGS. 4 and 5, respectively, can be employed in the practice of the present invention.

Referring first to FIG. 4 showing the first method of assembling the roller retainer 3, this method is particularly employed to assemble the retainer-equipped roller bearing employing the roller retainer 3 having the slits 7 (7A) defined only at one end thereof such as shown in FIGS. 2A and 2C.

According to this first assembling method, after the rollers 2 have been arranged inside the outer race 1, the roller retainer 3 is inserted axially into the circular row of the rollers 2 from the side of one axial end or the openings of the slits 7 (7a). Positioning of the rollers 2 inside the outer race 1 is carried out by, for example, applying a grease to each of the rollers 2 and allowing the individual rollers 2 to stick to the inner peripheral surface of the outer race 1 by the effect of an adhesive property exhibited by the applied grease. The job of inserting the roller retainer 3 into the circular row of the rollers 2 is carried out by radially inwardly constricting such one axial end of the roller retainer 3, which is to be first inserted into the outer race 1, by the use of an expandable chuck 11 having a conical inner surface and then by pushing the roller retainer 3 to a position inside the circular row of the rollers 2 by the use of a pusher jig 12. After the insertion of the roller retainer 3, the roller retainer 3 is allowed to restore to the original shape or diameter by the effect of the elasticity owned by the material used to form the roller retainer 3. In this way, the rollers 2 are inserted into and retained in the respective pockets 4 of the roller retainer 3.

The expandable chuck 11 may be of a type including a plurality of divided chuck segments arranged in a circular row and can be available in the form of a collet chuck.

Since in the first assembling method the roller retainer 3 can be elastically deformed by the effect of the elasticity possessed by the material used to form the roller retainer 3, a flexure deformation of the roller retainer 3 can advantageously be minimized and an undesirable reduction in shape precision brought about by the deformation can advantageously be prevented, thereby increasing the assemblability and the assembling precision. Also, the first assembling method can be automated.

Referring now to FIG. 5 showing the second method of assembling the roller retainer 3, this method is particularly employed to assemble the retainer-equipped roller bearing employing the roller retainer 3 having the slits 7 defined at the opposite axial ends thereof such as shown in FIG. 2B.

Even in the practice of this second assembling method, after the rollers 2 have been arranged inside the outer race 1, the roller retainer 3 is inserted axially into the circular row of the rollers 2. However, the job of inserting the roller retainer 3 in this second method is carried out by radially inwardly constricting either one axial end or the other axial end of the roller retainer 3, which is to be first inserted into the outer race 1, by the use of a guide jig 13 having a conical inner peripheral surface into which the roller retainer 3 is pushed to reduce the diameter of such roller retainer 3. After the insertion of the roller retainer 3, the roller retainer 3 is allowed to restore to the original shape to assume the original diameter by the effect of the elasticity owned by the material used to form the roller retainer 3, to thereby accomplish the insertion of the rollers 2 into the respective pockets 4 in the roller retainer 3.

As described above, where the roller retainer 3 has the slits 7 arranged at the opposite axial ends in the circumferential direction thereof to form a ladder-like structure, the roller bearing can readily be assembled merely by pushing the roller retainer 3 into the guide jig 13, with no need to use any chuck. Even in this case, a flexure deformation of the roller retainer 3 can advantageously be minimized and an undesirable reduction in shape precision brought about by the deformation can advantageously be prevented, thereby increasing the assemblability and the assembling precision. Also, since the roller retainer 3 has the slits 7 arranged at the opposite axial ends thereof, the roller retainer 3 can be inserted from either one axial end side or the other axial end side during the insertion, allowing the assemblability to be further increased. In addition, even the second assembling method can be automated with a simplified structure.

Figure 6A:
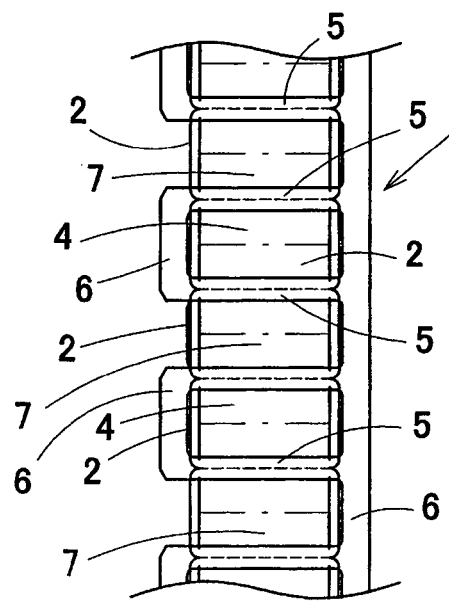
FIG. 6A is a fragmentary plan view of the roller retainer, showing the manner in which rollers are arranged in the roller retainer.
Figure 6B:
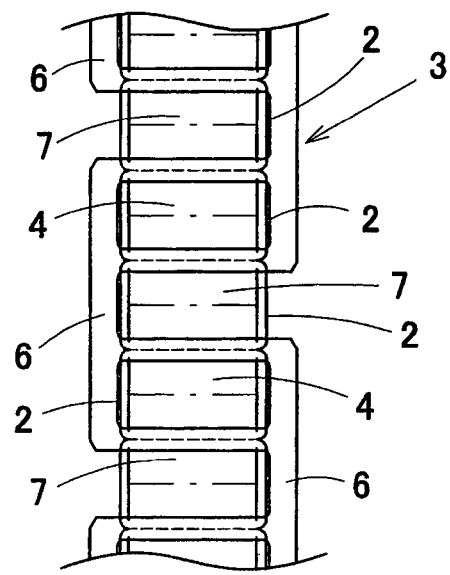
FIG. 6B is a view similar to FIG. 6a, showing the different manner in which the rollers are arranged in the roller retainer.

FIG. 6 illustrates an assembled condition of the roller retainer 3, in which the rollers 2 have been inserted in the respective pockets 4 of the roller retainer 3. In particular, FIG. 6A illustrates the roller retainer 3 having the slits 7 defined only at one axial end thereof such as shown in FIG. 2A, in which the rollers 2 are received not only in the pockets 4, but also in the slits 7. This is particularly advantageous in that the load bearing capacity of the roller bearing can be increased. On the other hand, FIG. 6B illustrates the roller retainer 3 having the slits 7 defined at the opposite axial ends thereof such as shown in FIG. 2B, in which the rollers 2 are received not only in the pockets 4, but also in the slits 7.

With the roller bearing so constructed as hereinbefore described, since the pillars 5 present between the neighboring pockets 4 and also between the pockets 4 and the slits 7, 7A are so positioned between the neighboring rollers 2 to retain the rollers 2 in position from the radially inner side of the roller bearing and since the outer diameter d30 of the circle depicted by respective vertexes of the pillars 5 of the roller retainer 3 is chosen to be smaller than the diameter of the pitch circle PCD as hereinbefore described, an undesirable separation or detachment of the rollers 2 from the roller retainer 3 can be effectively prevented.

Figure 7:
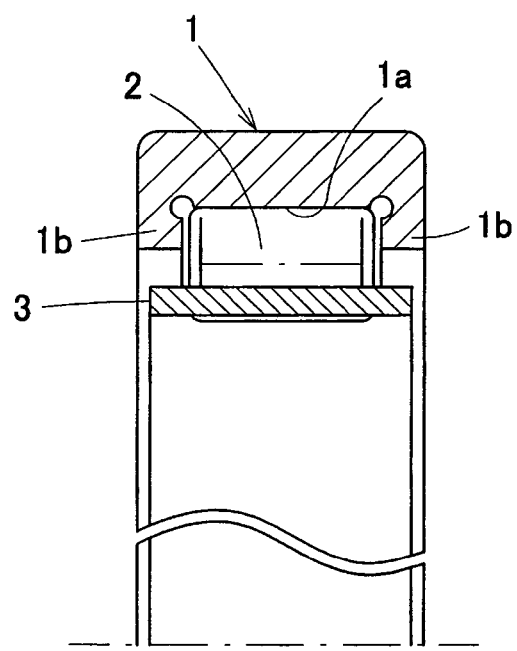
FIG. 7 is a fragmentary longitudinal sectional view of the roller bearing having an outer race formed by grinding.

It is to be noted that although in the foregoing embodiment the outer race 1 has been described as employed in the form of the press-worked product, the outer race 1 may be produced by grinding, such as shown in FIG. 7. Even with the outer race 1 of the machined product, the roller retainer 3 can be incorporated inside the outer race 1 with an increased assemblability and an increased assembling precision.

In addition, as shown in FIG. 8, at least one of the opposite outer peripheral ends 3a of the roller retainer 3 is preferably so shaped as to represent a chamfered shape which may be either tapered or rounded.

Figure 8A:
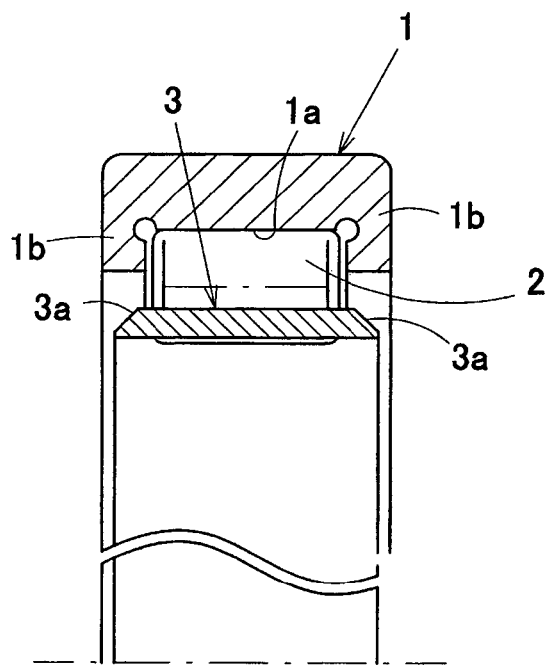
FIG. 8A is a fragmentary longitudinal sectional view of the roller bearing according to another preferred embodiment of the present invention.

More specifically, FIG. 8A illustrates the opposite outer peripheral ends 3a representing a tapered configuration, which can be employed in the roller retainer 3 having the slits 7 defined at the opposite axial ends thereof such as shown in FIG. 2B. The use of the tapered configuration in the opposite outer peripheral ends 3a of the roller retainer 3 is advantageous in that the insertion of the roller retainer 3 into the circular row of the rollers 2 from an axial direction during the assemblage can be accomplished smoothly, resulting in increase of the assemblability. Since the roller retainer 3 of FIG. 2B has the opposite outer peripheral ends 3a tapered, the insertion of the roller retainer 3 into the circular row of the rollers 2 can advantageously be accomplished smoothly in any one of the axial directions. It is to be noted that the outer race 1 of FIG. 8 is produced by grinding.

Figure 8B:
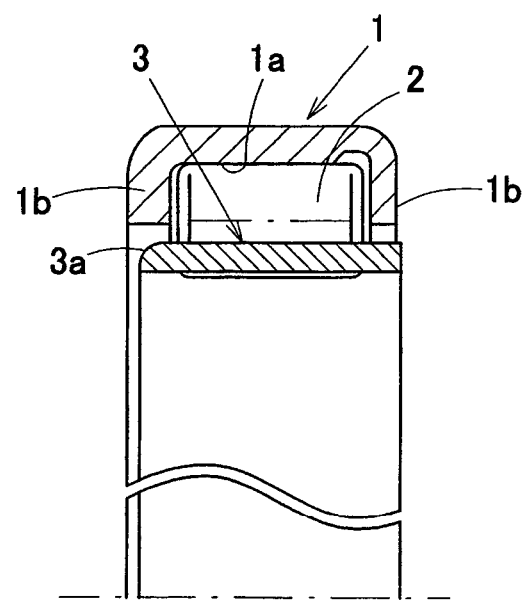
FIG. 8B is a view similar to FIG. 8A, showing the roller bearing according to a further preferred embodiment of the present invention.

FIG. 8B illustrates one of the opposite outer peripheral ends 3a representing a rounded configuration, which can be employed in the roller retainer 3 having the slits 7 defined only at one axial end thereof such as shown in any one of FIGS. 2A and 2C. The rounded configuration is formed only in one axial end of the roller retainer 3, at which a cutout is made to define the respective slit 7 (7A). During the assemblage, the roller retainer 3 is inserted into the circular row of the rollers 2 from the side of the openings of the slits 7 (7A). Accordingly, the insertion of the roller retainer 3 can be performed smoothly with the assemblability increased consequently. It is to be noted that in the example shown in FIG. 8B the outer race 1 is employed in the form of the press-worked product.

Figure 9A:
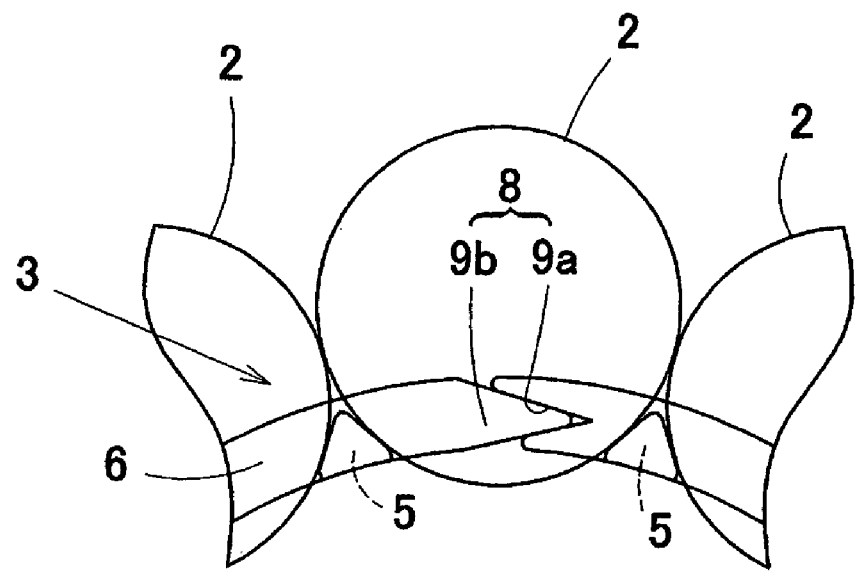
FIGS. 9A, 9B and 9C are explanatory diagrams showing different split areas employed in the roller retainer, respectively.
Figure 9B:
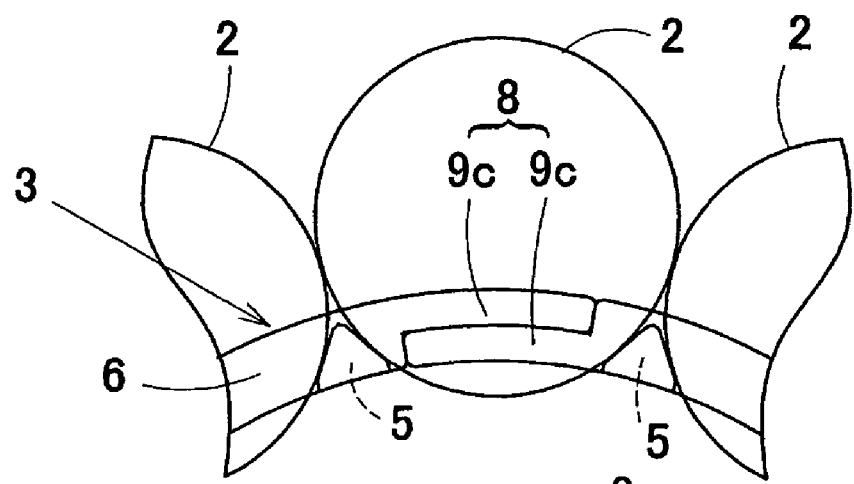
Figure 9C:
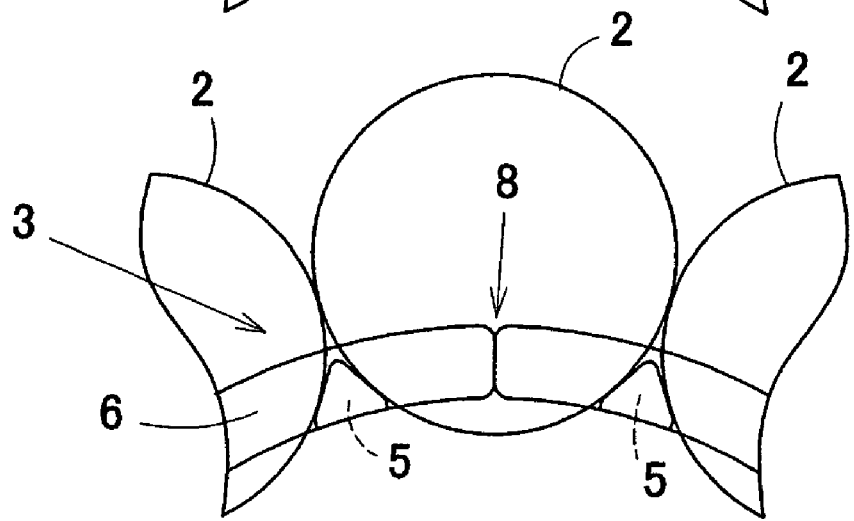

Although in describing the foregoing embodiment the roller retainer 3 have been shown and described as having the plural slits 7 (7A) deployed in the circumferential direction thereof, the roller retainer 3 may have a split area 8 at one location thereof in the circumferential direction thereof as shown in any one of FIGS. 9A to 9C. This split area 8 is defined in one or both the ring parts 6 at one side or opposite sides of the pocket 4. The split area 8 may be of a design in which a recess 9a defined in one end of the divided ring part 6 of the roller retainer 3 can releasably receive therein a projection 9b defined in the opposite end of the divided ring part 6 as shown in FIG. 9A or of a design in which the opposite ends of the divided ring part 6 may have respective projections 9c, which form a halving joint, as shown in FIG. 9B. Alternatively, as shown in FIG. 9C, the opposite ends of the divided ring part 6 may be so shaped as to define a respective flat end face so that the opposite ends of the divided ring part 9 can be butt-jointed. In each of the examples shown respectively in FIGS. 9A to 9C, the roller retainer 3 is shown in a condition where one of the ring parts 6, having the split area 8, is radially inwardly deformed. The split area 8, when an external force applied for the deformation is released, returns to the original condition in which the opposite ends 9a and 9b or 9c and 9c are not in tight contact with each other.

Even where the split area 8 is defined in the roller retainer 3 at one location in the circumferential direction thereof as hereinabove described, one of the ring parts 6 of the roller retainer 3 where the split area 8 is defined can be radially inwardly deformed as is the case with the roller retainer 3 having the slits 7 (7A). For this reason, during the assemblage, the roller retainer 3 can be inserted into the circular row of the rollers 2 without undesirable deformation, resulting in increase of the assemblability and the assembling precision. In a manner similar to the foregoing embodiment in which the rollers 2 are arranged inside the slits 7, 7A, a roller 2 may be arranged in a pocket equivalent slit having one side surrounded by the ring part 6 having the split area 8 defined therein to open to the other side. By so arranging the rollers 2 in the manner described above, the load bearing capacity of the roller bearing can advantageously be increased.

Also, in describing any one of the foregoing embodiments, the roller retainer 3 has been shown and described as satisfying the design condition in which the pillars 5 each between the neighboring pockets 4 retain the rollers from the radially inner side of the roller bearing at respective locations between the rollers 2 and the outer diameter d3o is smaller than the pitch circle diameter PCD. However, even if the slits 7, 7A or the split area 8 are employed in the roller retainer 3 failing to satisfy the above design condition, the assemblability can be increased as is the case with the foregoing embodiments.

The roller bearing of the present invention can be employed in various applications similar to those in which the conventional full complement roller bearing having the outer race is employed. For example, the roller bearing of the present invention can be equally employed in a rear suspension link of a motorcycle, as a rocker arm bearing of a roller type, as a bearing for a seat reclining mechanism and so on.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A roller bearing comprising:
   an outer race having a raceway defined therein;
   a plurality of rollers held in rolling contact with the raceway; and
   a ring-shaped roller retainer having opposite axial ends each in the form of a ring part and a plurality of pockets defined between complete portions of the opposite ring parts, each pocket rollingly receiving then respective roller, spacedly defined therein in a direction circumferentially thereof to form a ladder structure,
   wherein the roller retainer has a plurality of slits that are spacedly defined in a direction circumferential thereof so as to extend from one axial end or the other axial end of the roller retainer to a position adjacent the other axial end or one axial end, each of the slits accommodating therein a corresponding roller,
   wherein the roller retainer has pillars, each defined between the neighboring pockets, each of which pillars is positioned between the neighboring rollers to retain the corresponding rollers from a radially inner side of the roller bearing, and also has an outer diameter of a circle depicted by respective pillars of the roller retainer is smaller than the diameter of a pitch circle depicted by a circular row of the rollers,
   wherein the roller retainer has an inner diameter which is greater by 0.1 mm or more than a maximum diameter of a circle inscribed by a circular row of the rollers,
   wherein each of the pillars has a thickness within a range of 15 to 30% of a diameter of the rollers, so that the rollers of a substantially similar number to a maximum capacity number of a bearing space of the bearing are accommodated within the bearing, and
   wherein one of the ring parts has at least one portion adjacent to one of the pockets being completely depleted and at least another portion adjacent to another one of the pockets being partially depleted.

2. The roller bearing as claimed in claim 1, wherein the width of each of the slits as measured in a direction circumferentially of the roller retainer and the number of the slits employed in the roller retainer are so chosen that the outer diameter of a ring body assumed by a ring part of the roller retainer if circumferentially extending arcuate portions of the roller retainer excluding the slits are jointed together may be smaller than the diameter of a circle inscribed by a circular row of the rollers.

3. The roller bearing as claimed in claim 1, wherein at least one of opposite outer peripheral ends of the roller retainer is so chamfered as to represent a tapered shape or a rounded shape.

* * * * *

UNITED STATES PATENT AND TRADEMARK OFFICE
CERTIFICATE OF CORRECTION

| | | |
|---|---|---|
| PATENT NO. | : 7,766,555 B2 | |
| APPLICATION NO. | : 11/052771 | |
| DATED | : August 3, 2010 | |
| INVENTOR(S) | : Shingo Kono et al. | |

It is certified that error appears in the above-identified patent and that said Letters Patent is hereby corrected as shown below:

Column 11, Line 26 in Claim 1, delete "then" and insert -- a --, therefor.

Signed and Sealed this
Seventh Day of June, 2011

David J. Kappos
*Director of the United States Patent and Trademark Office*